United States Patent
Koyama et al.

(10) Patent No.: US 10,852,401 B2
(45) Date of Patent: Dec. 1, 2020

(54) DISTANCE MEASUREMENT APPARATUS AND DISTANCE MEASUREMENT METHOD

(71) Applicant: SONY CORPORATION, Tokyo (JP)

(72) Inventors: Takahiro Koyama, Kanagawa (JP); Toyoharu Oohata, Tokyo (JP); Tomoki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 15/752,123

(22) PCT Filed: Jun. 6, 2016

(86) PCT No.: PCT/JP2016/002725
§ 371 (c)(1),
(2) Date: Feb. 12, 2018

(87) PCT Pub. No.: WO2017/037968
PCT Pub. Date: Mar. 9, 2017

(65) Prior Publication Data
US 2018/0238999 A1   Aug. 23, 2018

(30) Foreign Application Priority Data
Sep. 2, 2015 (JP) .................. 2015-172716

(51) Int. Cl.
*G01C 3/08* (2006.01)
*G01S 7/4865* (2020.01)
(Continued)

(52) U.S. Cl.
CPC .............. *G01S 7/4865* (2013.01); *G01C 3/06* (2013.01); *G01S 17/10* (2013.01); *G01S 17/87* (2013.01)

(58) Field of Classification Search
CPC . G01C 3/06; G01S 17/87; G01S 17/10; G01S 7/4865
(Continued)

(56) References Cited

U.S. PATENT DOCUMENTS

2009/0315135 A1   12/2009   Finkelstein et al.
2011/0108702 A1   5/2011   Jackson et al.
(Continued)

FOREIGN PATENT DOCUMENTS

EP   2183617 A2   5/2010
EP   2469301 A1   6/2012
(Continued)

OTHER PUBLICATIONS

International Search Report and Written Opinion of PCT Application No. PCT/JP2016/002725, dated Aug. 30, 2016, 10 pages.
(Continued)

*Primary Examiner* — Mark Hellner
(74) *Attorney, Agent, or Firm* — Chip Law Group

(57) ABSTRACT

A distance measurement apparatus includes at least one measurement unit. The measurement unit includes a first light reception section including a plurality of photon counting type light reception devices connected to each other and a first conversion section that converts a current outputted from the first light reception section into a voltage. The measurement unit further includes a first amplification section that outputs an amplification value obtained by amplifying the voltage outputted from the first conversion section and outputs, when the amplification value exceeds a given limit value, the limit value as the amplification value. The measurement unit further includes a first measurement section that measures a timing at which the output value from the first amplification section reaches a given threshold value.

10 Claims, 5 Drawing Sheets

(51) Int. Cl.
*G01S 17/10* (2020.01)
*G01C 3/06* (2006.01)
*G01S 17/87* (2020.01)

(58) Field of Classification Search
USPC ........................................................ 356/5.01
See application file for complete search history.

(56) References Cited

U.S. PATENT DOCUMENTS

| | | | | |
|---|---|---|---|---|
| 2012/0261553 | A1* | 10/2012 | Elkind | H04N 5/335 250/208.1 |
| 2013/0250272 | A1* | 9/2013 | Ludwig | G01S 17/10 356/4.01 |
| 2013/0300838 | A1 | 11/2013 | Borowski | |
| 2015/0177369 | A1* | 6/2015 | Kostamovaara | G01S 7/4863 356/5.08 |
| 2015/0338270 | A1* | 11/2015 | Williams | G01J 1/44 250/214.1 |
| 2016/0033644 | A1* | 2/2016 | Moore | G01S 17/10 356/5.01 |

FOREIGN PATENT DOCUMENTS

| | | |
|---|---|---|
| GB | 2451678 A | 2/2009 |
| JP | 2008-070159 A | 3/2008 |
| JP | 2008-153930 A | 7/2008 |
| JP | 2010-243444 A | 10/2010 |
| JP | 2010-536186 A | 11/2010 |
| JP | 2012-060012 A | 3/2012 |
| JP | 4898176 B2 | 3/2012 |
| JP | 2012-068038 A | 4/2012 |
| JP | 2015-119093 A | 6/2015 |
| TW | 201534954 A | 9/2015 |
| WO | 2008/011617 A2 | 1/2008 |
| WO | 2009/022166 A2 | 2/2009 |
| WO | 2012/085149 A1 | 6/2012 |
| WO | 2015/093482 A1 | 6/2015 |

OTHER PUBLICATIONS

Office Action for JP Patent Application No. 2017-537191, dated May 12, 2020, 04 pp. of Office Action and 03 pp. of English Translation.

* cited by examiner

DISTANCE MEASUREMENT APPARATUS AND DISTANCE MEASUREMENT METHOD

CROSS REFERENCE TO RELATED APPLICATIONS

This application is a U.S. National Phase of International Patent Application No. PCT/JP2016/002725 filed on Jun. 6, 2016, which claims priority benefit of Japanese Patent Application No. JP 2015-172716 filed in the Japan Patent Office on Sep. 2, 2015. Each of the above-referenced applications is hereby incorporated herein by reference in its entirety.

TECHNICAL FIELD

The present disclosure relates to a distance measurement apparatus and a distance measurement method.

BACKGROUND ART

Conventionally, a distance measurement apparatus is known in which time before reflection light is received after pulse light is irradiated upon a measurement target (referred to sometimes as flight time (TOF (Time Of Flight))) is measured to measure a distance to the measurement target. For example, in PTL 1, a distance measurement apparatus is described in which an avalanche photodiode is used in a light reception section.

CITATION LIST

Patent Literature

[PTL 1]
Japanese Patent No. 4898176

SUMMARY

Technical Problem

In the field of such a distance measurement apparatus as described above, it is demanded that a distance is measured with a higher degree of accuracy.

Accordingly, it is one of objects of the present disclosure to provide a distance measurement apparatus and a distance measurement method by which a distance can be measured with a higher degree of accuracy.

Solution to Problem

In order to solve the subject described above, the present disclosure is, for example,
  a distance measurement apparatus, including:
  at least one measurement unit;
  the measurement unit including
    a first light reception section including a plurality of photon counting type light reception devices connected to each other,
    a first conversion section configured to convert current outputted from the first light reception section into a voltage,
    a first amplification section configured to output an amplification value obtained by amplifying the voltage outputted from the first conversion section and output, when the amplification value exceeds a given limit value, the limit value as the amplification value, and
    a first measurement section configured to measure a timing at which an output value from the first amplification section reaches a given threshold value.

Further, the present disclosure is, for example,
  a distance measurement method, including:
  receiving, by a first light reception section configured from a plurality of photon counting type light reception devices connected to each other, from between reference light projected from a light projection section and reflection light when light projected from the light projection section is reflected by a measurement target, at least the reflection light;
  converting, by a first conversion section, current outputted from the first light reception section in response to the reception of the reflection light into a voltage;
  outputting, by a first amplification section, an amplification value obtained by amplifying the voltage outputted from the first conversion section and outputting, when the amplification value exceeds a given limit value, the limit value as the amplification value; and
  measuring, by a first measurement section, a timing at which an output value from the first amplification section reaches a given threshold value.

Advantageous Effect of Invention

With at least one embodiment of the present disclosure, the distance to the measurement target can be measured with a higher degree of accuracy. It is to be noted that the effect described here is not necessarily restrictive and any of the effects described in the present disclosure may be exhibited. Further, the substance of the present disclosure shall not be interpreted limitatively by the exemplified effects.

DESCRIPTION OF EMBODIMENT

In the following, an embodiment and so forth of the present disclosure are described with reference to the drawings. It is to be noted that the description is given in accordance with the following order.

<1. Embodiment>
<2. Modification>

The embodiment and so forth hereinafter described are suitable particular examples of the present disclosure, and the substance of the present disclosure is not limited to the embodiment and so forth.

1. Embodiment

Example of Configuration of Distance Measurement Apparatus

Figure 1:
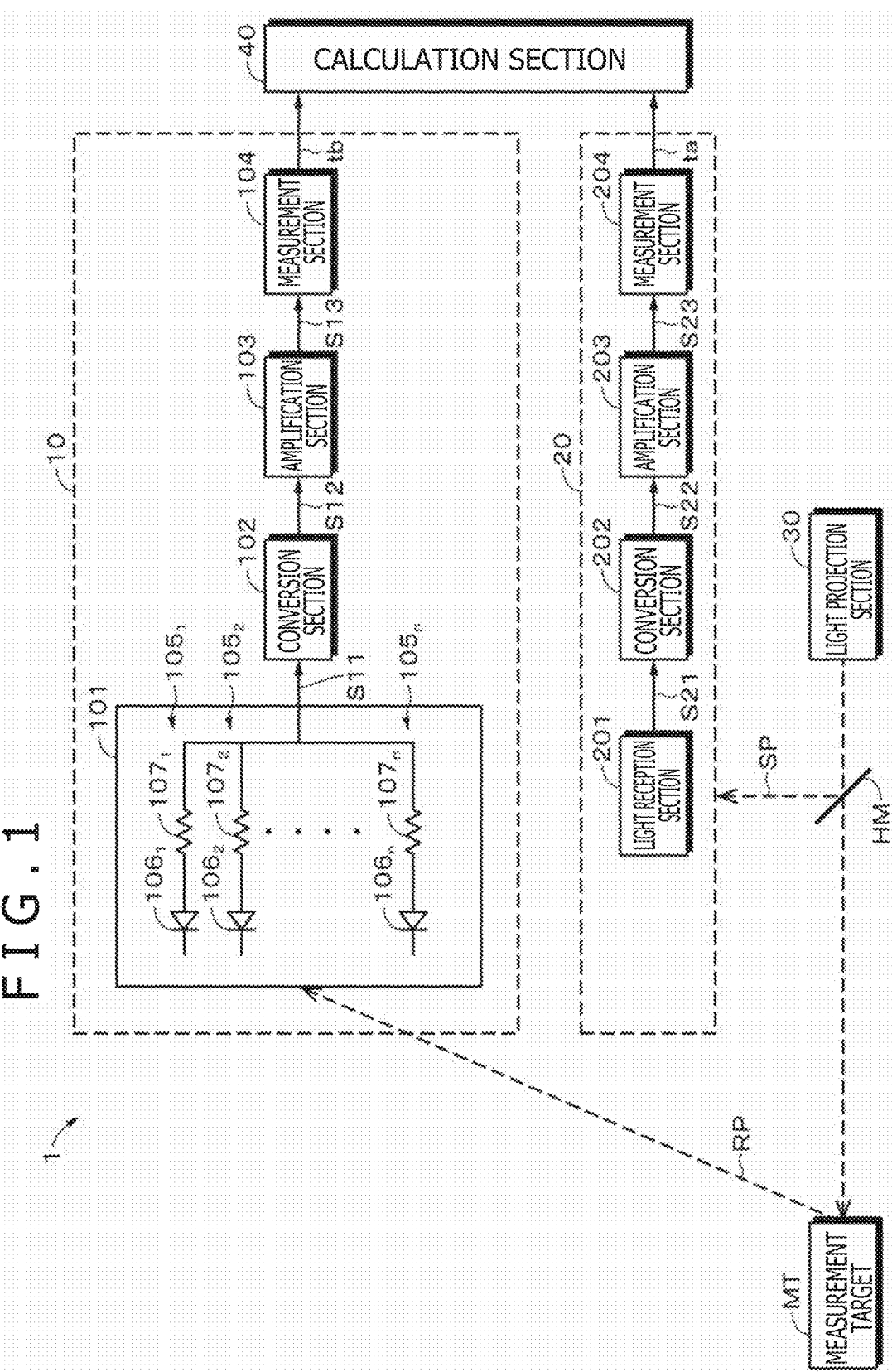
FIG. 1 is a block diagram depicting a configuration of a distance measurement apparatus according to an embodiment.

FIG. 1 depicts an example of a configuration of a distance measurement apparatus 1 according to an embodiment of the present disclosure. For example, the distance measurement apparatus 1 includes a first measurement unit 10 as one measurement unit, a second measurement unit 20 as a different measurement unit, a light projection section 30 and a calculation section 40. Schematically describing, the distance measurement apparatus 1 according to the present embodiment is an apparatus in which, while the first measurement unit 10 receives reflection pulse light RP (reflection light) from a measurement target MT from within pulse light irradiated from the light projection section 30, the second measurement unit 20 receives reference pulse light SP (reference light), and that determines flight time $T_{TOF}$ of the pulse light from a difference between the light reception timings, multiplies the flight time $T_{TOF}$, for example, by the speed of light, and divides a result of the multiplication by 2 to measure the distance to the measurement target TM.

The components of the distance measurement apparatus 1 are described in detail. The first measurement unit 10 includes, for example, a light reception section 101, a conversion section 102, an amplification section 103 and a measurement section 104. The light reception section 101 is configured by connecting a plurality of photon counting type light reception devices in parallel to each other, for example. As the photon counting type light reception device, in the present embodiment, a single photon avalanche photodiode (hereinafter suitably referred to as SPAD (Single Photon Avalanche Diode) is used.

As depicted in FIG. 1, the light reception section 101 is configured from a plurality of SPAD $105_1$, SPAD $105_2$, ... SPAD $105_n$ (n is an arbitrary integer), and, where the SPADs need not be distinguished from each other in the following description, each SPAD is referred to simply as SPAD 105. The SPAD 105 includes an APD (Avalanche Photo Diode) 106 configured to operate under a reverse bias (referred to as Geiger mode) equal to or higher than a breakdown voltage and a quenching resistor 107 connected to the APD 106.

The conversion section 102 is configured from a device or a circuit that converts current outputted from the light reception section 101 into a voltage, and the conversion section 102 in the present embodiment is configured from a resistor connected between the light reception section 101 and the ground (GND).

The amplification section 103 is an amplifier (amplifier) that amplifies a voltage outputted from the conversion section 102 and outputs a voltage (amplification value) after amplification. While details are hereinafter described, where a voltage after amplification exceeds a given limit value, the amplification section 103 in the present embodiment is configured as a limiting amplifier that outputs the limit value.

The measurement section 104 measures a timing at which the voltage (output value) outputted from the amplification section 103 reaches a given threshold value and outputs the measured timing to the calculation section 40. The measurement section 104 in the present embodiment is configured from a time-digital converter (hereinafter referred to suitably as TDC (Time Digital Converter)) that converts the measured timing into and outputs a digital value.

Now, the second measurement unit 20 is described. The configuration of the second measurement unit 20 in the present embodiment is similar to that of the first measurement unit 10, and includes a light reception section 201, a conversion section 202, an amplification section 203 and a measurement section 204, for example.

The components of the second measurement unit 20 are described in brief. The light reception section 201 is configured by connecting a plurality of SPADs in parallel to each other. The conversion section 202 is configured from a device or a circuit that converts current outputted from the light reception section 201 into a voltage, and is configured from a resistor. The amplification section 203 is an amplifier that amplifies a voltage outputted from the conversion section 202 and outputs the voltage after amplification, and is configured as a limiting amplifier that outputs, where the voltage after amplification exceeds a given limit value, the limit value. The measurement section 204 is a TDC that measures a timing at which the voltage outputted from the amplification section 203 reaches a given threshold value and converts the measured timing into a digital value and then outputs the digital value to the calculation section 40.

The light projection section 30 includes, for example, a pulse laser diode as a light source, a driver for driving the pulse laser diode and so forth. When the driver operates, pulse light is emitted from the pulse laser diode. As an example, pulse light having a wavelength of approximately 800 nm (nanometer) and a half width of 100 ps (picosecond) or less is emitted from the light projection section 30 by repetitions of 20 MHz (megahertz). Although a wavelength that is included at a low ratio in solar light, which is ambient light, is preferable as a wavelength of the pulse light, pulse light having a wavelength different from that of the example described above may be used. Further, it is desirable to set the half width of the pulse light smaller than the rise time of a signal outputted from the SPAD 105 (hereinafter referred to suitably as SPAD signal).

The calculation section 40 is configured from a microcomputer or the like, and determines flight time $T_{TOF}$ on the basis of the difference between the timings inputted from each of sections including the measurement section 104 and measurement section 204. Then, the determined flight time $T_{TOF}$ is multiplied by the speed of light, and a result of the multiplication is divided, for example, by 2 to calculate the distance to the measurement target MT.

[Details of Light Reception Section]

Now, the light reception section 101 in the present embodiment is described in detail. It is to be noted that, since the light reception section 201 in the present embodiment has a configuration similar to that of the light reception section 101, the following description can be applied also to the light reception section 201.

If a single photon is received, then the APD 106 in the SPAD 105 causes avalanche multiplication and generates avalanche current by a multiplication factor of $10^5$ to $10^6$. The avalanche multiplication can be stopped by decreasing the voltage applied to the APD 106 to a breakdown voltage or less. This function is implemented by a quenching resistor 107. In particular, a voltage is generated across the quenching resistor 107 when avalanche current flows to the quenching resistor 107, and, as a result, the application voltage to the APD 106 drops to stop the avalanche multiplication. From the mechanism described above, the SPAD signal is used as a current pulse that decreases exponentially.

The APD 106 does not react even if it receives a different photon within a period that is a given period and within which avalanche multiplication occurs. Generally, the dead period is several ns (nanoseconds). In particular, the photon counting type light reception device includes, for example, a device (for example, APD 106) that does not react even if it receives, after a single photon is received, a different photon within a given period and signifies a device capable of deciding that one photon is received by monitoring an output.

Incidentally, a dark count and an after pulse are available as the noise signal generated from the SPAD 105. The dark count is a pulse signal generated by a thermally excited carrier, and the after pulse is a pulse signal generated by discharging of a carrier after the carrier is captured by a crystal defect or the like in the process of avalanche multiplication.

Where the light reception section 101 is configured from a single SPAD 105 as in the technology described in PTL 1, it is difficult to distinguish the noise signal described above and the reflection pulse light RP (or may be reference pulse light SP) from each other, and a high S/N (Signal to Noise) ratio cannot be obtained. Therefore, in the present embodiment, the light reception section 101 is configured as a multi-pixel type light reception section in which a plurality of SPADs 105 are connected in parallel to each other. Consequently, since a number of photons equal to the number of SPADs 105 connected in parallel to each other can be received at the same time and SPAD signals outputted from the SPADs 105 are outputted in a superimposed relationship, the SPAD signal and a noise signal that can be generated accidentally can be distinguished from each other. Further, a signal having a high S/N ratio can be obtained, and also weak reflection pulse light RP can be received.

Figure 2:
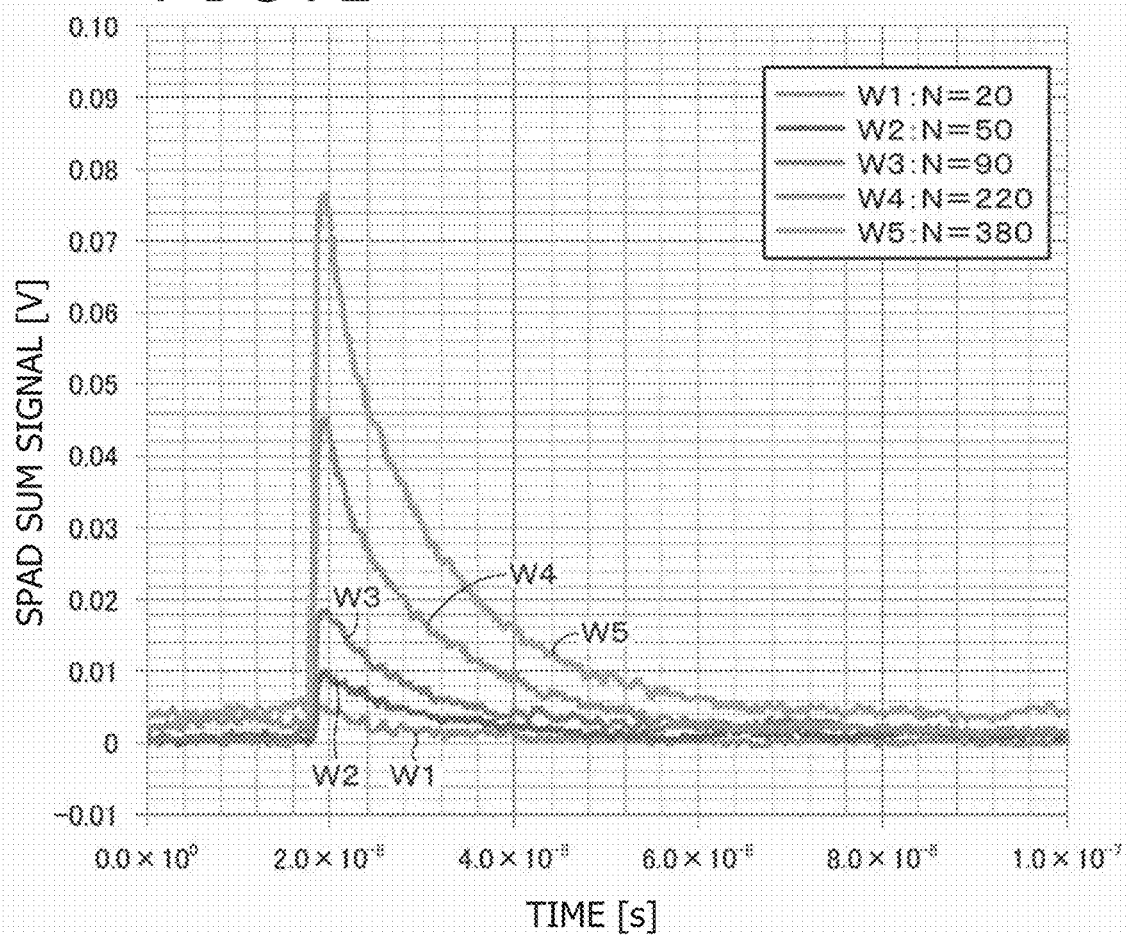
FIG. 2 is a view depicting an example of a waveform of a SPAD sum signal according to the embodiment.

FIG. 2 depicts an example of a waveform of a voltage signal generated by the conversion section 102 after a current signal outputted from the light reception section 101 is supplied to the conversion section 102. The current signal outputted from the light reception section 101 is obtained by synthesizing current signals outputted from the respective SPADs 105, and is hereinafter referred to suitably as SPAD sum signal.

In FIG. 2, the axis of ordinate indicates a value of the voltage and the axis of abscissa indicates time. It is to be noted that, in the present embodiment, SPADs 105 of 120 vertical×120 horizontal connected in parallel (the interval (pitch interval) between the SPADs 105 is 25 µm (micrometer)) were used as the light reception section 101. Since the dynamic range of the reflection pulse light capable of being received is equal to the number of SPADs in the maximum and 14,400 SPADs 105 are connected in parallel, 1 to 14,400 photons can be received and the number of the dynamic range becomes four digits or more.

In FIG. 2, a waveform W1 indicates a waveform of the SPAD sum signal when the light reception section 101 receives 20 photons and a waveform W2 indicates a waveform of the SPAD sum signal when the light reception section 101 receives 50 photons, and a waveform W3 indicates a waveform of the SPAD sum signal when the light reception section 101 receives 90 photons. Further, a waveform W4 indicates a waveform of the SPAD sum signal when the light reception section 101 receives 220 photons, and a waveform W5 indicates a waveform of the SPAD sum signal when the light reception section 101 receives 380 photons.

Generally, where a plurality of SPADs 105 are used, it is considered that a dispersion occurs with the timing at which each SPAD 105 receives a photon and the SPAD sum signal becomes separated into a plurality of signals. However, by setting the half width of the pulse light to be emitted from the light projection section 30 sufficiently smaller than the rise time of the SPAD signal, as depicted in FIG. 2, the SPAD sum signal does not become separated signals and can be handled as a waveform that attenuates exponentially similarly to the SPAD signal.

The rise time of the SPAD sum signal is approximately 1 ns and the fall time (time in which the signal level becomes 1/e (e indicates a logarithm)) is approximately 20 ns, and also a waveform variation of the SPAD sum signal arising from increase of the number of SPADs 105 that receives the light is not found. The peak level of the SPAD sum signal increases as the number of received photons increases, and the signal level per one photon is approximately 0.2 mV (millivolt). Remarkable amplification of the noise level is not found, and a SPAD sum signal whose S/N ratio is improved can be obtained by increase of the number of received photons.

Simultaneous reception of a great number of photons by the plurality of SPADs 105 can not only improve the S/N ratio but also decrease the dispersion of light reception time arising from the SPADs 105 (hereinafter referred to suitably as SPAD jitters). This point is described in detail.

Where a population of a normal distribution is assumed, if specimens of a size N are extracted from a population of an average value m and a standard deviation σ, the average value m' and the deviation σ' of the specimens are given by m'=m and σ'=σ/√N, respectively. Here, if jitters unique to a SPAD 105 are represented by σ_SPAD, then the effective SPAD jitters at the time when N photons are simultaneously received are given by σ_SPAD/√N and the effective SPAD jitters can be reduced by an increasing amount as N of the number of photons increases. In other words, the SPAD jitters can be confined within the range of statistical error by increasing the number of photons N to be received using a plurality of SPADs 105. In other words, the SPAD jitters when light is received by a plurality of SPADs 105 can be made smaller than the SPAD jitters when light is received by an individual one of the SPADs 105. Since the light reception section 101 is configured from a plurality of SPADs 105 in this manner, the jitters in the light reception section 101 can be reduced, and degradation of the accuracy of light measurement by the influence of jitters can be prevented.

As depicted in FIG. 2, the convergence time in which the SPAD sum signal converges is 60 ns to 80 ns and can be ready for the repetition frequency of 10 MHz (100 ns in period) of the pulse light from the light projection section 30. This convergence time depends upon the time constant of the circuit including the SPADs 105 and so forth and principally relies upon the total parasitic capacitance of the plurality of SPADs 105 configuring the light reception section 101. The convergence time can be reduced by decreasing the pitch interval or by decreasing the number of SPADs 105, and this can cope also with distance measurement that is repeated at a further higher speed. In other words, the number, array mode and so forth of the SPADs 105 are not limited to the exemplified ones and can be set arbitrarily taking an application of the distance measurement apparatus 1, intensity of the reflection pulse light RP and so forth into consideration.

[Details of Amplification Section]

Now, the amplification section 103 in the present embodiment is described in detail. It is to be noted that, since, in the present embodiment, also the amplification section 203 is configured similarly to the amplification section 103, the following description can be applied also to the amplification section 203.

Figure 3:
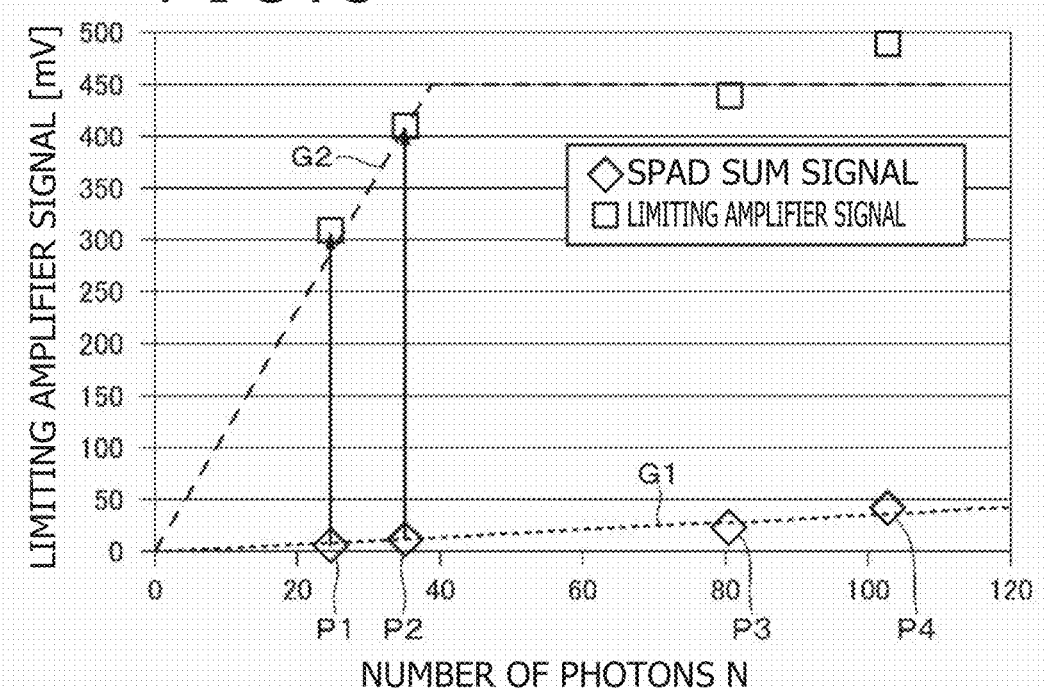
FIG. 3 is a view illustrating an example of a feature of an amplification section according to the embodiment.

FIG. 3 is a view illustrating a feature of the amplification section 103. Referring to FIG. 3, the axis of ordinate indicates the voltage of a signal outputted from the amplification section 103, and the axis of abscissa indicates the number of photons N. Four points (P1, P2, P3 and P4) plotted on a broken line G1 in the graph indicate peak values (peak levels) of the SPAD sum signal at different photons similarly to those depicted in FIG. 2.

As depicted at the points P1 to P4, the peak values of the SPAD sum signal are several tens mV and lower than an input standard voltage (for example, 100 mV) to the measurement section 104 at the succeeding stage. Accordingly, it is necessary to amplify the voltage (level) of the SPAD sum signal by the amplification section 103.

Here, in the present embodiment, while the dynamic range of the SPAD signal can be increased, for example, to 4 digits or more by configuring the light reception section 101 from a plurality of SPADs 105, if the SPAD sum signal is linearly amplified over the overall dynamic range, then the SPAD sum signal will exceed the input standard of a digital circuit used in the measurement section 104 at the succeeding stage. Therefore, preferably the amplification section 103 is an amplifier that amplifies a signal of a low level but limits, when the amplification value exceeds the input standard ($V_{lim}$) of a digital circuit in the measurement section 104, the output power within the standard.

As such a specification as described above, for example, a limiting amplifier can be used. The limiting amplifier is a high-speed high-gain amplifier optimized for an application for a gigabit Ethernet (GbE) or an optical fiber-channel light receiver and is an IC (Integrated Circuit) chip that amplifies input signals of different signal amplitudes into a differential signal output of a fixed amplitude and waveform shapes the differential signal output. A significant feature of the limiting amplifier is that, while it amplifies input signals with a uniform differential gain, an output exceeding the fixed value is limited (limited) and a rated output is obtained irrespective of the input signal level.

As an example, the amplitude amplification factor where a limiting amplifier having a differential amplification factor of 126 times is 63 times. As depicted in FIG. 3, when the level of the SPAD sum signal is low, the level is amplified substantially linearly (linearly) by 63 times, and a SPAD sum signal after amplification (hereinafter referred to suitably as limiting amplifier signal) is generated. For example, approximately 0.005 V of a level (peak level) of the SPAD sum signal where the number of photons N is 20 is amplified by the limiting amplifier, and a limiting amplifier signal of a level of approximately 300 mV of a single end output is generated.

On the other hand, when the level of the limiting amplifier signal exceeds a limit voltage (for example, approximately 450 mV) of the measurement section 104, the signal level is limited to a fixed level. For example, the SPAD sum signal where the number of photons N is 120 is amplified such that the output level thereof is limited by the limiting amplifier such that a limiting amplifier signal of a level of approximately 450 mV is generated. A configuration that satisfies the input standard of the measurement section 104 at the succeeding stage can be achieved in such a manner as described above. In particular, by adopting the configuration just described while the light reception section 101 is configured from a plurality of SPADs 105 in order to achieve a wide dynamic range of a signal, the amplification section 103 can be configured such that inconvenience that may possibly occur can be prevented. It is to be noted that, where the amplification factor of the amplification section 103 is insufficient, a linear amplifier or the like may be provided at a preceding stage.

[Operation of Distance Measurement Apparatus]

Now, an example of operation of the distance measurement apparatus 1 is described. When a driver of the light projection section 30 operates, pulse light is emitted from the light projection section 30. Part of the pulse light is reflected by a half mirror HM, and the reflected light is received as reference pulse light (non-reflection pulse light) SP by the light reception section 201 of the second measurement unit 20. As the reference pulse light SP is received, a SPAD sum signal S21 is outputted from the light reception section 201. Then, the conversion section 202 converts the SPAD sum signal S21 that is a current pulse into a SPAD sum signal S22 of a voltage pulse and outputs the SPAD sum signal S22 to the amplification section 203.

Figure 4:
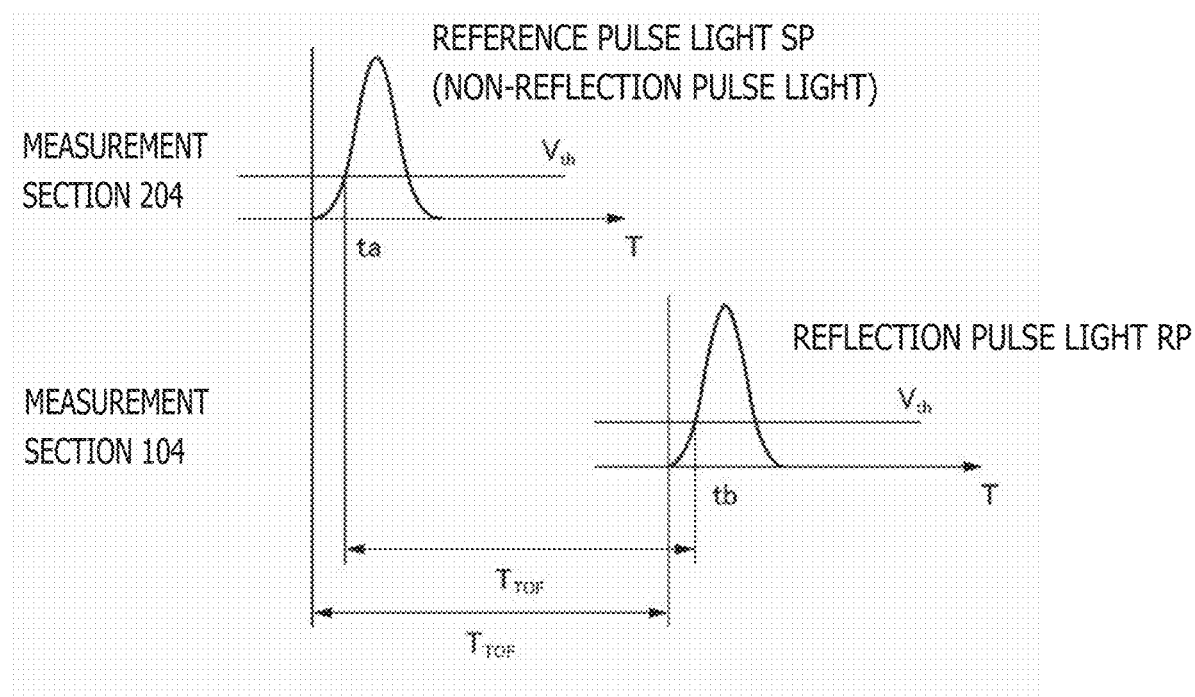
FIG. 4 is a view illustrating an example of processing of a measurement section according to the embodiment.

The amplification section 203 amplifies the SPAD sum signal S22 to generate a limiting amplifier signal S23, which is outputted to the measurement section 204. The measurement section 204 measures a timing ta at which the voltage of the limiting amplifier signal S23 reaches a given threshold value $V_{th}$ and generates a digital signal indicative of the timing ta as depicted in FIG. 4. The measurement section 204 outputs the digital signal representative of the timing ta to the calculation section 40. It is to be noted that, while, in FIG. 4, a waveform of the reference pulse light SP is depicted as a waveform approximate to a Gaussian function, the actual waveform of a signal handled by processes after the conversion section 202 is the waveform exemplified in FIG. 2 (this similarly applies also to the reflection pulse light RP and FIGS. 6 and 7 hereinafter described).

Meanwhile, part of the pulse light is reflected by a measurement target MT and is received as reflection pulse light RP by the light reception section 101 of the first measurement unit 10. As the reflection pulse light RP is received, a SPAD sum signal S11 is outputted from the light reception section 101. Then, the conversion section 102 converts the SPAD sum signal S11, which is a current pulse, into a SPAD sum signal S12 of a voltage pulse and outputs the SPAD sum signal S12 to the amplification section 103.

The amplification section 103 amplifies the SPAD sum signal S12 to generate a limiting amplifier signal S13, which is outputted to the measurement section 104. The measurement section 104 measures a timing tb, at which the voltage of the limiting amplifier signal S13 reaches the given threshold value $V_{th}$, and generates a digital signal indicative of the timing tb as depicted in FIG. 4. The measurement section 104 outputs a digital signal representative of the timing tb to the calculation section 40.

The calculation section 40 determines the difference (tb−ta) between the timing tb inputted from the measurement section 104 and the timing ta inputted from the measurement section 204. Then, the calculation section 40 multiplies the difference (tb−ta) corresponding to a flight time $T_{TOF}$ of the pulse light by the speed of light and dividing a result of the multiplication by 2 to calculate the distance to the measurement target MT, thereby ending the series of processes.

It is to be noted that, if it is assumed that the probability distribution expected value of the error of each component of the apparatus varies in accordance with a normal distribution and such probability distribution expected values have errors independent of one another, then an error of a combination of them is given by the square root of sum of squares of errors of the components on the basis of the additivity of variance. In particular, the accuracy of distance measurement of the distance measurement apparatus 1 is given by a square root of sum of squares of jitters of each of sections including the light reception section 101, conversion section 102, amplification section 103 and measurement section 104 of the first measurement unit 10 (this similarly applies also to the second measurement unit). It is to be noted that the distance accuracy here is accuracy of distance measurement per one point per one pulse.

In the present embodiment, it is possible to perform distance measurement in accordance with a repeat cycle (for example, from 10 MHz to several tens MHz) of the pulse light emitted from the light projection section 30. However, by performing measurement by Q times per one point, the standard error decreases to one √Qth (1/√Q) the accuracy of the distance measurement described hereinabove, and the accuracy of distance measurement can be further enhanced. Therefore, the number of times of measurement per one point may be increased. (However, the repetitions of distance measurement becomes one Qth.)

The distance measurement apparatus 1 according to the embodiment has been described in detail. As described above, it becomes possible to perform more accurate distance measurement by the distance measurement apparatus 1. It is to be noted that it seems a possible idea to configure a light reception section from a plurality of SPADs and provide a plurality of discrimination circuits for converting an output signal from each of the SPADs into a rectangular pulse. However, with this configuration, although jitters of the light reception section can be reduced, since the influence of jitters of other factors increases, the accuracy of distance measurement cannot be improved. The distance measurement apparatus 1 of the present embodiment is configured such that output signals of each of the SPADs are treated as one SPAD sum signal and only one processing system (conversion section 102, amplification section 103 and measurement section 104) for processing the SPAD sum signal is provided. Therefore, the components can be reduced, and degradation of the accuracy of distance measurement by jitters of the individual components and a dispersion of the delay time can be prevented.

It is to be noted that also it becomes possible to use an APD in place of a SPAD as a device for receiving weak light to increase the light reception time period (integration time period) or detect weak reflection pulse light by increasing the light reception area of the APD. However, in order to repeat distance measurement at a high speed, it is desirable to use the SPAD. It is to be noted that, also where the SPAD is used, the light reception area of the APD (APD 106 in the embodiment described hereinabove) may be made great. However, in this case, since there is the possibility that an increase of the convergence time period of the SPAD sum signal by increase of the parasitic capacitance may occur, in order to perform distance measurement at a high speed and besides make the light reception sensitivity of the SPAD higher than a given level, it is necessary to appropriately set the size of the APD.

2. Modifications

While the embodiment of the present disclosure has been described particularly, the substance of the present disclosure is not limited to the embodiment described above, and various modifications based on the technological idea of the present disclosure are possible. In the following, modifications are described.

Modification 1

Figure 5:
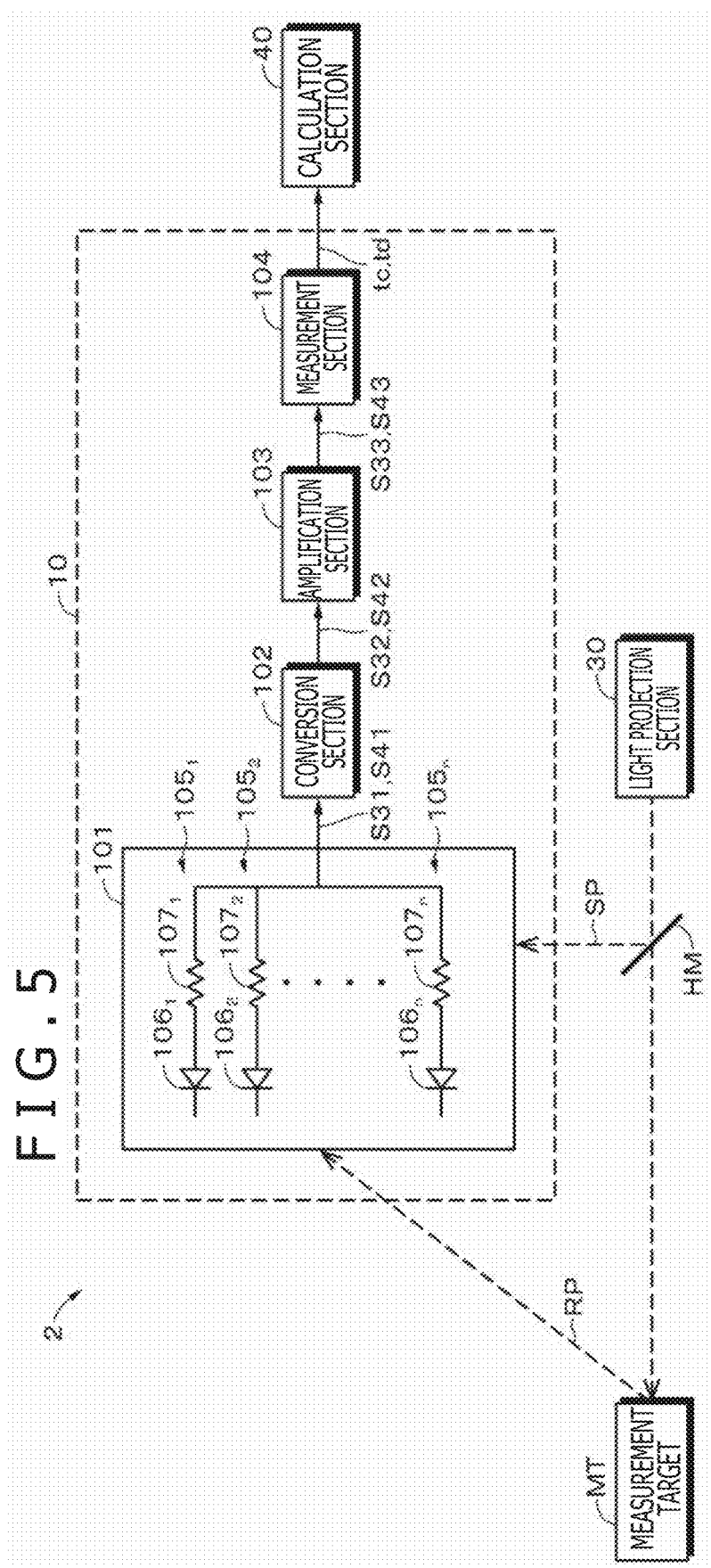
FIG. 5 is a block diagram depicting a configuration of a distance measurement apparatus according to a modification.

FIG. 5 depicts a configuration of a distance measurement apparatus (distance measurement apparatus 2) according to a modification 1. The distance measurement apparatus 2 is different in configuration from the distance measurement apparatus 1 in that it does not include the second measurement unit 20.

Operation of the distance measurement apparatus 2 is described. When the driver of the light projection section 30 operates, pulse light is emitted from the light projection section 30. Part of the pulse light is reflected by the half mirror HM and is received as reference pulse light SP by the light reception section 101. In response to the reception of the reference pulse light SP, a SPAD sum signal S31 is outputted from the light reception section 101. Then, the conversion section 102 converts the SPAD sum signal S31 that is a current pulse into a SPAD sum signal S32 of a voltage pulse and outputs the SPAD sum signal S32 to the amplification section 103.

The amplification section 103 amplifies the SPAD sum signal S32 to generate a limiting amplifier signal S33, which is outputted to the measurement section 104. The measurement section 104 measures a timing tc at which the voltage of the limiting amplifier signal S33 reaches the given threshold value $V_{th}$ and generates and temporarily stores a digital signal indicative of the timing tc.

On the other hand, after lapse of a fixed period of time, reflection pulse light RP reflected by the measurement target MT is received by the light reception section 101. Receiving the reflection pulse signal PR, the light reception section 101 outputs a SPAD sum signal S41. Then, the conversion section 102 converts the SPAD sum signal S41 that is a current pulse into a SPAD sum signal S42 of a voltage pulse, which is outputted to the amplification section 103.

The amplification section 103 amplifies the SPAD sum signal S42 to generate a limiting amplifier signal S43, which is outputted to the measurement section 104. The measurement section 104 measures a timing td at which the voltage of the limiting amplifier signal S43 reaches the given threshold value $V_{th}$ and generates and temporarily stores a digital signal indicative of the timing td. Then, the measurement section 104, for example, time division multiplexes the digital signals indicative of the timing tc and the timing td and outputs a result of the time division multiplexing to the calculation section 40.

The calculation section 40 determines the difference (td−tc) between the timing tc and the timing td inputted thereto from the measurement section 104. Then, the calculation section 40 multiplies the difference (td−tc) corresponding to the flight time $T_{TOF}$ the pulse light by the speed of light and then dividing a result of the multiplication by 2 to calculate the distance to the measurement target MT, thereby ending the series of processes.

As described above, the distance measurement apparatus of the present disclosure must only include at least one distance measurement unit (exemplified first measurement unit 10) and may not necessarily include two distance measurement units. It is to be noted that the distance measurement apparatus may include three or more distance measurement units such that distance measurement to multiple points is performed in parallel. In the modification 1 described above, the timing tc acquired early in time may be stored by the calculation section 40.

Modification 2

Figure 6:
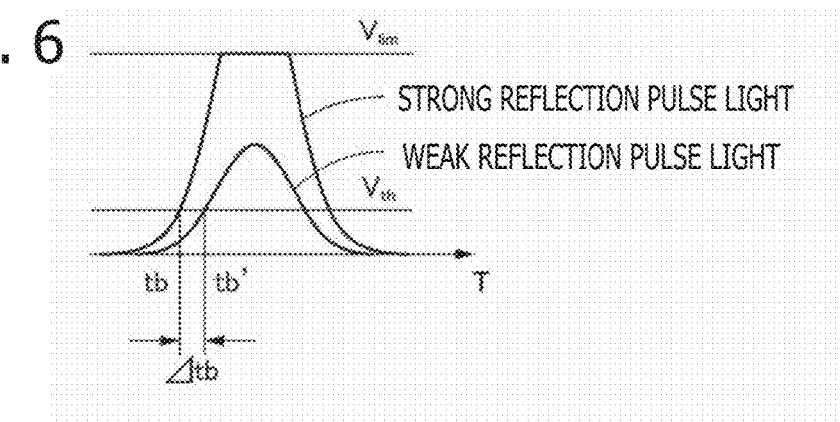
FIG. 6 is a view illustrating an example of an error that can appear in response to light intensity of reflection pulse light.
Figure 7:
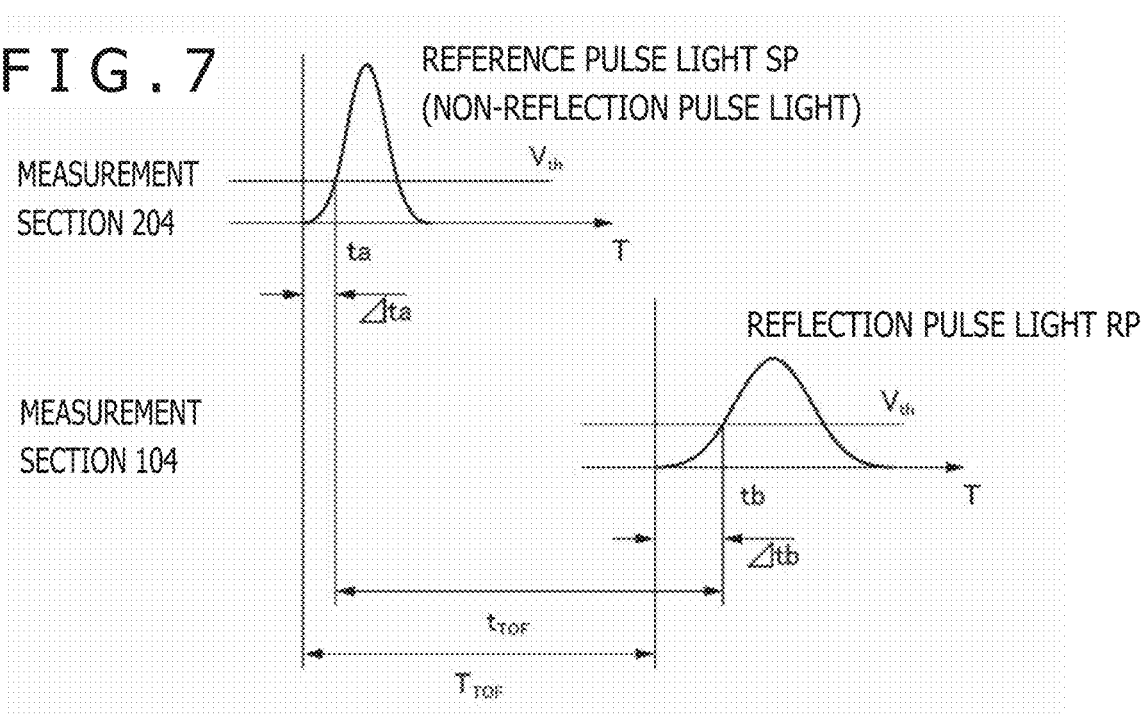
FIG. 7 is a view illustrating that the accuracy of distance measurement decreases in response to an error.

Now, a modification 2 is described. The light intensity of the reflection pulse light RP received by the light reception section 101 varies depending upon a condition such as the distance to the measurement target MT, a reflectance of the measurement target MT or the like. The transmission signal (pulse light) is not a complete triangle wave, but the voltage variation amount with respect to time is small at a rising edge and in the proximity of a pulse top of the signal. As depicted in FIG. 6, when the light intensity of the reflection pulse light RP is low, the time at which the light intensity reaches the given threshold value $V_{th}$ is delayed by $\Delta tb$ (=tb'−tb) in comparison with that in the case of the reflection pulse light RP having a light intensity at high level. From this error $\Delta tb$, the distance to the measurement target MT is calculated longer, and there is the possibility that an influence may be had on the accuracy of light measurement. It is to be noted that, although the fluctuation of the light intensity of the reference pulse light SP received by the light reception section 201 is small, an error $\Delta ta$ possibly occurs. As depicted in FIG. 7, since the flight time $t_{TOF}$ measured by the calculation section 40 has a value different by an amount ($\Delta tb−\Delta ta$) from the true flight time $T_{TOF}$, in order to achieve a high distance resolution, it is necessary to correct the error amount ($\Delta tb−\Delta ta$).

As a method for correcting the error amount ($\Delta tb−\Delta ta$), for example, the following method is applicable. As exemplified in FIG. 2, since SPAD sum signals outputted from the light reception section 101 are substantially same in waveform itself although they vary in wavelength peak value in response to the number of photons, if the peak value of the reflection pulse light RP is measured, then the number of photons can be obtained. For example, by preparing a table that associates the number of photons and $\Delta tb$ with each other and referring to the table, $\Delta tb$ can be estimated from the obtained number of photons. Since the variation of the light intensity of the reference pulse light SP is small as described above, if the error value $\Delta ta$ is 0 or a fixed value, then the error amount ($\Delta tb−\Delta ta$) can be obtained. Then, by subtracting the obtained error amount ($\Delta tb−\Delta ta$) from the flight time $t_{TOF}$, the true flight time $T_{TOF}$ can be obtained, and by multiplying the flight time $T_{TOF}$ by the speed of light and dividing a result of the multiplication by 2, an accurate distance can be calculated. Such a correction process as described above may be executed by the calculation section 40 or may be executed by a control section such as a microcomputer. The distance measurement accuracy can be further improved by the distance measurement apparatus of the present disclosure executing the correction process described above.

Other Modifications

Other modifications are described. A system for processing the reflection pulse light RP and a system for processing the reference pulse light SP, namely the configuration of the first measurement unit 10 and the configuration of the second measurement unit 20, preferably have an equal wiring line length and have a same configuration, but may be different in configuration. For example, since the light reception section 201 of the second measurement unit 20 receives the reference pulse light SP of a comparatively high light intensity, it may be configured from a PD (Photo Diode) or the like without necessarily using the SPAD. Further, the configuration at succeeding stages to the light reception section 201 may be configured suitably in response to the configuration of the light reception section 201. For example, where the level of a signal outputted from the conversion section 202 is sufficient, the configuration of the amplification section 203 may not be provided. Further, the transmittance of the half mirror HM and so forth may be suitably changed in response to the feature of the light reception section 201.

The photon counting type light reception device is not limited to the SPAD, and also it is possible to use other light reception devices that output a signal in accordance with the number of received photons. Further, the light reception section 101 may be configured by electrically connecting a plurality of SPADs 105 two-dimensionally (or three-dimensionally), and the connection scheme of them is not limited to parallel connection but can be suitably changed. The quenching resistor 107, conversion section 102 or conversion section 202 configuring the SPAD 105 is not limited to a resistor but may be a different circuit element such as a transistor.

The amplification section 103 is not limited to a nonlinear amplifier such as a limiting amplifier. For example, a plurality of amplifiers having different amplification factors from each other may be provided such that a SPAD sum signal is amplified with a different amplifier in response to the voltage thereof. This similarly applies also to the amplification section 203.

The measurement section 104 is not limited to the TDC. For example, a CFD (Constant Fraction Discriminator) that detects a zero cross point (corresponding to the timing to or the like) by adding an attenuation waveform of a given waveform and a waveform obtained by delaying and reversing the given waveform or a like element may be used. This similarly applies also to the measurement section 204.

The distance measurement apparatus 1 and 2 according to the embodiment and the modifications described above need not include all of the components described above but may additionally include or omit an arbitrary component or components and also it is possible to integrate a function of a certain component into a function of a different component.

For example, the distance measurement apparatus 1 and 2 may not include the light projection section 30. The distance measurement apparatus 1 and 2 may not include the calculation section 40. The distance measurement apparatus 1 and 2 may include only one of the light projection section 30 and the calculation section 40.

The function of the calculation section 40 may be borne by the measurement section 104 or the measurement section 204. For example, the measurement section 204 is configured such that it inputs a signal representative of the timing ta to the measurement section 104. Then, the measurement section 104 may determine the flight time $T_{TOF}$ from the timings ta and tb and multiply the flight time $T_{TOF}$ by the speed of light to calculate the distance to the measurement target MT.

The distance measurement apparatus of the present disclosure may not be used as a single unitary distance measurement apparatus but may be used in a form in which it is incorporated in various apparatus. For example, the distance measurement apparatus may be incorporated in a projector apparatus. Then, the distance measurement apparatus may be configured such that distance measurement is performed for different points of a wall face that is a projection plane to identify unevenness of the wall face. A correction process (contrast improvement process, color tone improvement process or the like) may be performed for the entirety or part of image data of the projection image in response to the identified unevenness of the wall face. Further, the distance measurement apparatus of the present disclosure can be applied also to various electronic apparatus such as game machines and image pickup apparatus.

The distance measurement apparatus of the present disclosure can be applied also to a safety system that detects the distance to a pedestrian, an obstacle or the like and operates a brake in response to the distance. In particular, the distance measurement apparatus of the present disclosure can be applied also to a mobile body in which such a safety system as described above can be used such as an automobile, an electric train, an airplane, a helicopter or a small aircraft. Further, the distance measurement apparatus of the present disclosure can be applied also to a robot (hospitality robot, disaster relief robot, cleaning robot and so forth) or a security robot.

In the present disclosure, for example, the configurations, methods, steps, shapes, materials, numerical values and so forth described in the embodiment described above are nothing but examples to the last, and configurations, methods, steps, shapes, materials, numerical values and so forth different from those may be used as occasion demands. Further, the present disclosure can be implemented by an apparatus, a method, a system configured from a plurality of apparatus or the like, and the matters described in the embodiment and the modifications can be combined with each other unless they do not cause a technical contradiction.

It is to be noted that the present disclosure can take also such configurations as described below.

(1)
A distance measurement apparatus, including:
at least one measurement unit;
the measurement unit including
a first light reception section including a plurality of photon counting type light reception devices connected to each other,
a first conversion section configured to convert current outputted from the first light reception section into a voltage,
a first amplification section configured to output an amplification value obtained by amplifying the voltage outputted from the first conversion section and output, when the amplification value exceeds a given limit value, the limit value as the amplification value, and
a first measurement section configured to measure a timing at which an output value from the first amplification section reaches a given threshold value.

(2)
The distance measurement apparatus according to (1), further including:
a different measurement unit;
the different measurement unit including
a second light reception section,
a second conversion section configured to convert current outputted from the second light reception section into a voltage, and
a second measurement section configured to measure a timing at which an output value from the second conversion section reaches a given threshold value.

(3)
The distance measurement apparatus according to (2), in which
the different measurement unit includes
a second amplification section configured to output an amplification value obtained by amplifying the voltage outputted from the second conversion section and output, when the amplification value exceeds a given limit value, the limit value as the amplification value.

(4)
The distance measurement apparatus according to (2) or (3), in which
the first light reception section is configured to receive reflection light when light projected from a light projection section is reflected by a measurement target, and
the second light reception section is configured to receive reference light projected from the light projection section.

(5)
The distance measurement apparatus according to (4), further including:
the light projection section.

(6)
The distance measurement apparatus according to any one of (2) to (5), further including:
a calculation section configured to calculate a distance to a measurement target based on a difference between the timings obtained by the first and second measurement sections.

(7)
The distance measurement apparatus according to (1), in which the first light reception section is configured to receive reference light projected from a light projection section and reflection light when light projected from the light projection section is reflected by a measurement target.

(8)
The distance measurement apparatus according to any one of (1) to (7), in which the photon counting type light reception device includes a device that does not react even if, after a single photon is received, a different photon is received within a given period.

(9)
A distance measurement method, including:
receiving, by a first light reception section configured from a plurality of photon counting type light reception devices connected to each other, from between reference light projected from a light projection section and reflection light when light projected from the light projection section is reflected by a measurement target, at least the reflection light;
converting, by a first conversion section, current outputted from the first light reception section in response to the reception of the reflection light into a voltage;
outputting, by a first amplification section, an amplification value obtained by amplifying the voltage outputted from the first conversion section and outputting, when the amplification value exceeds a given limit value, the limit value as the amplification value; and
measuring, by a first measurement section, a timing at which an output value from the first amplification section reaches a given threshold value.

REFERENCE SIGNS LIST 1, 2 . . . Distance measurement apparatus
10 . . . First measurement unit
20 . . . Second measurement unit
30 . . . Light projection section
40 . . . Calculation section
101, 201 . . . Light reception section
102, 202 . . . Conversion section
103, 203 . . . Amplification section
104, 204 . . . Measurement section
MT . . . Measurement target

The invention claimed is:
1. A distance measurement apparatus, comprising:
a first measurement unit that includes:
a first light reception section including a plurality of photon counting type light reception devices, wherein
a first photon counting type light reception device of the plurality of photon counting type light reception devices is connected in parallel with a second photon counting type light reception device of the plurality of photon counting type light reception devices, and the first light reception section is configured to output a first current;

a first conversion section configured to:
convert the first current into a first voltage; and
output the first voltage;

a first amplification section configured to:
output a first amplification value by amplification of the first voltage; and
output, based on the first amplification value that exceeds a first limit value, the first limit value as the first amplification value; and a first measurement section configured to measure a first timing at which the first amplification value reaches a first threshold value.

2. The distance measurement apparatus according to claim 1, further comprising a second measurement unit different from the first measurement unit, wherein
the second measurement unit includes:
a second light reception section configured to output a second current;
a second conversion section configured to:
convert the second current into a second voltage; and
output the second voltage; and
a second measurement section configured to measure a second timing at which a value of the second voltage reaches a second threshold value.

3. The distance measurement apparatus according to claim 2, wherein the second measurement unit further includes:
a second amplification section configured to:
output a second amplification value by amplification of the second voltage; and
output, based on the second amplification value that exceeds a second limit value, the second limit value as the second amplification value.

4. The distance measurement apparatus according to claim 2, wherein
a measurement target reflects light projected from a light projection section,
the first light reception section is further configured to receive the reflected light, and
the second light reception section is further configured to receive reference light projected from the light projection section.

5. The distance measurement apparatus according to claim 4, further comprising the light projection section.

6. The distance measurement apparatus according to claim 2, further comprising:
a calculation section configured to calculate a distance between the distance measurement apparatus and a measurement target based on a difference between the first timing and the second timing.

7. The distance measurement apparatus according to claim 1, wherein the first light reception section is further configured to:
receive reference light projected from a light projection section; and
receive reflection light based on reflection of light by a measurement target, wherein the light is projected from the light projection section.

8. The distance measurement apparatus according to claim 1, wherein
the first photon counting type light reception device is configured to receive a first photon and a second photon, and
the first photon counting type light reception device includes a device that does not react based on the second photon that is received within a specific period after the reception of the first photon.

9. A distance measurement method, comprising:
receiving, by a first light reception section, at least one of reference light or reflection light, wherein
the reference light is projected from a light projection section,
the reflection light is based on reflection of light by a measurement target,
the light is projected from the light projection section,
the light reception section includes a plurality of photon counting type light reception devices, and
a first photon counting type light reception device of the plurality of photon counting type light reception devices is connected in parallel with a second photon counting type light reception device of the plurality of photon counting type light reception devices;
outputting, by the light reception section, a current based on the reception of the at least one of the reference light or the reflection light;
converting, by a conversion section, the current into a voltage;
outputting, by the conversion section, the voltage;
outputting, by an amplification section, an amplification value by amplifying the voltage; and
outputting, by the amplification section based on the amplification value that exceeds a limit value, the limit value as the amplification value; and
measuring, by a measurement section, a timing at which the amplification value reaches a threshold value.

10. The distance measurement apparatus according to claim 1, wherein the first amplification section is a limiting amplifier.

* * * * *